US008626347B2

(12) United States Patent
Watson et al.

(10) Patent No.: US 8,626,347 B2
(45) Date of Patent: Jan. 7, 2014

(54) DEMAND SIDE MANAGEMENT MODULE

(71) Applicant: General Electric Company, Schenectady, NY (US)

(72) Inventors: Eric K. Watson, Crestwood, KY (US); John K. Besore, Prospect, KY (US); Michael Thomas Beyerle, Pewee Valley, KY (US); David C. Bingham, Louisville, KY (US); Darin Franks, Lanesville, IN (US); Byron K. Guernsey, Charlestown, IN (US); Darko Ilickovic, Mount Washington, KY (US); Mallika Ravindra Patel, DesPlaines, IL (US); Brian Michael Schork, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/715,263

(22) Filed: Dec. 14, 2012

(65) Prior Publication Data
US 2013/0103222 A1 Apr. 25, 2013

Related U.S. Application Data

(62) Division of application No. 12/559,636, filed on Sep. 15, 2009, now Pat. No. 8,355,826.

(60) Provisional application No. 61/097,082, filed on Sep. 15, 2008.

(51) Int. Cl.
G05D 7/00 (2006.01)
G05D 11/00 (2006.01)
G05D 3/12 (2006.01)
G05D 5/00 (2006.01)
G05D 9/00 (2006.01)
G05D 17/00 (2006.01)

(52) U.S. Cl.
USPC ............................................. 700/282; 700/295

(58) Field of Classification Search
USPC ...................................................... 700/282, 295
See application file for complete search history.

(56) References Cited

U.S. PATENT DOCUMENTS 2,545,054 A 3/1951 Stitz
3,683,343 A 8/1972 Feldman et al.
(Continued)

FOREIGN PATENT DOCUMENTS

CN 1692317 A 11/2005
CN 101013979 A 8/2007
(Continued)

OTHER PUBLICATIONS

International Search Report from PCT Application No. PCT/US2009/056878, Nov. 17, 2009.

(Continued)

Primary Examiner — Ronald Hartman, Jr.
(74) Attorney, Agent, or Firm — Global Patent Operation; Marc A. Vivenzio

(57) ABSTRACT

A household appliance system comprising an appliance control system having a common appliance interface provided on an appliance and a demand side management module connected to the common appliance interface. The module corresponds to one select utility of a plurality of utilities and is configured to communicate with the one select utility of the plurality of utilities. The appliance control system operates the appliance based on communications with the one select utility through the module.

10 Claims, 25 Drawing Sheets

(56) References Cited

U.S. PATENT DOCUMENTS

| | | |
|---|---|---|
| 3,720,073 A | 3/1973 | McCarty |
| 4,048,812 A | 9/1977 | Thomason |
| 4,167,786 A | 9/1979 | Miller et al. |
| 4,190,756 A | 2/1980 | Foerstner |
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,903,502 A | 2/1990 | Hanson et al. |
| 4,998,024 A | 3/1991 | Kirk et al. |
| 5,040,724 A | 8/1991 | Brinkruff et al. |
| 5,137,041 A | 8/1992 | Hall et al. |
| 5,183,998 A | 2/1993 | Hoffman et al. |
| 5,220,807 A | 6/1993 | Bourne et al. |
| 5,224,355 A | 7/1993 | So et al. |
| 5,230,467 A | 7/1993 | Kubsch et al. |
| 5,289,362 A | 2/1994 | Liebl et al. |
| 5,408,578 A | 4/1995 | Bolivar |
| 5,430,430 A | 7/1995 | Gilbert |
| 5,451,843 A | 9/1995 | Kahn et al. |
| 5,462,225 A | 10/1995 | Massara et al. |
| 5,479,157 A | 12/1995 | Suman et al. |
| 5,479,558 A | 12/1995 | White et al. |
| 5,481,140 A | 1/1996 | Maruyama et al. |
| 5,495,551 A | 2/1996 | Robinson et al. |
| 5,504,306 A | 4/1996 | Russell et al. |
| 5,505,377 A | 4/1996 | Weiss |
| 5,515,692 A | 5/1996 | Sterber et al. |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,761,083 A | 6/1998 | Brown et al. |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,937,942 A | 8/1999 | Bias et al. |
| 5,956,462 A | 9/1999 | Langford |
| 6,018,150 A | 1/2000 | Maher |
| 6,026,651 A | 2/2000 | Sandelman |
| 6,080,971 A | 6/2000 | Seitz |
| 6,118,099 A | 9/2000 | Lake |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 | 10/2003 | Ghent et al. |
| 6,694,753 B1 | 2/2004 | Lanz et al. |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,860,431 B2 | 3/2005 | Jayadev |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 * | 11/2005 | Horst .......................... 700/295 |
| 6,983,210 B2 | 1/2006 | Matsubayashi et al. |
| 7,010,363 B2 | 3/2006 | Donnelly et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 | 7/2006 | Wiebe et al. |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,541,941 B2 * | 6/2009 | Bogolea et al. .......... 340/870.02 |
| 7,561,977 B2 | 7/2009 | Horst et al. |
| 7,565,813 B2 | 7/2009 | Pouchak |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 | 5/2012 | Besore |
| 8,190,302 B2 | 5/2012 | Burt et al. |
| 8,355,748 B2 | 1/2013 | Abe et al. |
| 8,367,984 B2 | 2/2013 | Besore et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 * | 5/2004 | Horst .......................... 700/295 |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 | 12/2004 | Donnelly et al. |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0190139 A1 | 8/2006 | Reaume et al. |

(56) References Cited

U.S. PATENT DOCUMENTS

| | | |
|---|---|---|
| 2006/0208570 A1 | 9/2006 | Christian et al. |
| 2006/0272830 A1 | 12/2006 | Fima |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1 | 11/2008 | Mueller et al. |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1 | 9/2009 | Chang et al. |
| 2009/0240381 A1 | 9/2009 | Lane |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Real-Time Feedback, Natural Resources Canada via website www.nrcan.gc.ca , 2008, http://oee.nrcan.gc.ca/publications/equipment/10918.
International Search Report from PCT Application No. PCT/US2009/056911, Mar. 10, 2010.
Lemay et al., An Integrated Architecture for Demand Response Communications and Control, University of Illinois Urbana-Champaign, Oct. 28, 2008.
Search Report from CN Application No. 201010135268.8 dated Oct. 24, 2012.
Weisstein, Eric W. "At Least One.", From MathWorld—A Wolfram Web Resource. http://mathworld.wolfram.com/AtLeastOne.html, p. 1.

* cited by examiner

| | | | |
|---|---|---|---|
| REFRIGERATOR | REFR UI RESPONSE (DSM DISABLED) | DURING OPERATION | NORMAL DISPLAY |
| | REFR UI RESPONSE (DSM ENABLED) | DURING OPERATION | DISPLAY "ECO RATE LOW-NORMAL OPERATION" |
| WASHER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | WASHER UI RESPONSE (DSM ENABLED) | PRIOR TO OPERATION | NORMAL DISPLAY |
| | WASHER UI RESPONSE (DSM ENABLED) | DURING OPERATION | NORMAL DISPLAY |
| DRYER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | DRYER UI RESPONSE (DSM ENABLED) | PRIOR TO OPERATION | NORMAL DISPLAY |
| | DRYER UI RESPONSE (DSM ENABLED) | DURING OPERATION | NORMAL DISPLAY |
| RANGE | RANGE UI RESPONSE (DSM DISABLED OR NORMAL) | PRIOR TO OPERATION | NORMAL DISPLAY |
| | | DURING OPERATION | NORMAL DISPLAY |
| | RANGE UI RESPONSE (DSM ENABLED) | PRIOR TO OPERATION | NORMAL DISPLAY |
| | | DURING OPERATION | NORMAL DISPLAY |
| DISHWASHER | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |
| MWO | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |

MATCH TO FIG. 9B

Fig. 9A

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH - FEATURES DELAYED" | DISPLAY "ECO RATE CRITICAL - FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

Fig. 9B

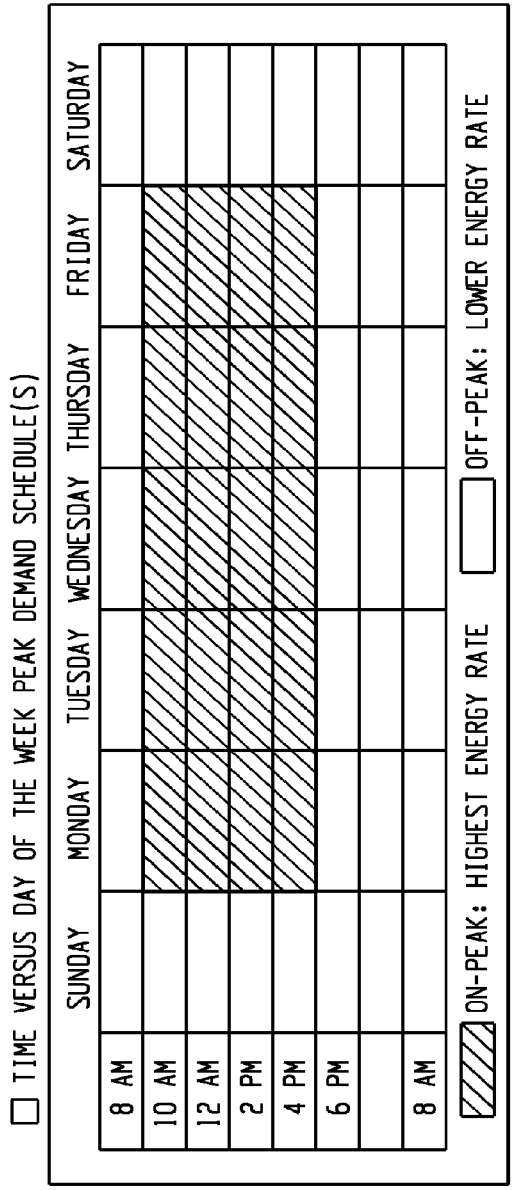

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTTING THE TIME-OF-USE SCHEDULE (A) CONSUMER ZIP CODE ENTRY - REQUIRES A DATABASE MANAGED BY GE AND UPGRADEABLE
    (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS
    (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK
    (B) PRECHILL WHEN NEARING PEAK DEMAND TO KEEP THE COMPRESSOR USAGE AT A MINIMUM DURING PEAK DEMAND
    (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

*Fig. 11*

A LIST OF ACTIONS THAT COULD BE PERFORMED AT TIMES WHEN THE ELECTRIC RATES ARE OFF PEAK

> DELAY DEFROST UNTIL OFF PEAK

> PRECHILL WHEN NEARING PEAK DEMAND TO KEEP THE COMPRESSOR USAGE AT A MINIMUM DURING PEAK DEMAND

> ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED
IN CONJUNCTION WITH A DEMAND SIDE MANAGEMENT (DSM) SYSTEM. THIS IS PART OF THE ADVANCED METERING
INFRASTRUCTURE (AMI) INITIATIVE WHICH PROVIDES REMOTE METERING FUNCTIONS SUCH AS REMOTE METER READING,
DEMAND SIGNALING/LOAD CONTROL, ETC.. THE ATTACHED DOCUMENT DESCRIBES IN BRIEF DETAIL
ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:

i. ICE MAKER ii. BEVERAGE CENTER iii. TURBO COOL iv. CUSTOM COOL v. QUICK ICE b) OVERRIDE THE HIGH PRICED ENERGY SIGNAL, ALWAYS OR BASED ON A CERTAIN $/Kwh LEVEL c) DELAY DEFROST UNTIL PEFORMANCE IS WOULD BE AFFECTED d) ANNOUNCE OR AUDIBLE ALERT OF THE "HIGH PRICED ENERGY SIGNAL" DURING A CYCLE e) VISUALLY ALERT USER OF THE "HIGH PRICED ENERGY" SIGNAL f) DISPLAY THE COST OF RUNNING THE UNIT IN THE SELECTED MODE OF OPERATION g) DISPLAY THE COST OF ENERGY AT THE PRESENT TIME h) DISABLE LIGHTING i) TURN OFF SWEAT HEATERS

Fig. 21

DEMAND SIDE MANAGEMENT MODULE

CROSS-REFERENCE TO RELATED APPLICATIONS

The present application is a divisional application of U.S. patent application Ser. No. 12/559,636, filed on Sep. 15, 2009; which in turn claims priority to U.S. Provisional Patent Application Ser. No. 61/097,082, filed on Sep. 15, 2008, both of which are herein incorporated by reference in their entireties as part of the present disclosure.

BACKGROUND OF THE INVENTION

This disclosure relates to energy management, and more particularly to energy management of household consumer appliances. The disclosure, finds particular application to changing existing appliances is add-on features or modules, and incorporating new energy saving features and functions into new appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during, on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria, rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, (0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMU system will need to communicate to appliances. HVAC, water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF SUMMARY OF THE INVENTION

The present disclosure reduces power consumption during on-peak hours by reducing the energy demand on the power generation facility, and also enabling the user/consumer to pay less to operate the appliance on an annual basis.

This disclosure is a low-cost alternative to using expensive or complicated methods of determining when peak electrical rates apply. For example, when the refrigerator is in peak shaving mode or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time then the system knows, for example, that it is morning.

This disclosure provides a peak-sharing appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined, morning starts. Similarly, the ambient light sensor can also be used for dimming the refrigerator lights. This disclosure advantageously uses ambient light to determine when to start peak shaving.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied alter the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off while the module continued to monitor rates.

It one exemplary embodiment, a household appliance system includes an appliance control system having a common appliance interface provided on an appliance and a demand side management module connected to the appliance interface. The module corresponds to one select utility of a plurality of utilities and is adapted to communicate with the one select utility of the plurality of utilities. The appliance control system operates the appliance based on communications with the one select utility through the module.

In another exemplary embodiment, a method is provided for configuring an appliance to communicate with one select utility of a plurality of utilities. In the method, a module is selected from a plurality of modules corresponding to one select utility of a plurality of utilities. The selected module is deployed in an appliance. The appliance then communicates with the one select utility through the module and is operated based on the communication with the one select utility.

In a further exemplary embodiment, a method is provided for configuring appliances to communicate with utilities. In the method, a first set of modules is provided corresponding to a first utility and a second set of modules is provided corresponding to a second utility. The first set of modules is deployed in a first set of appliances for communicating with the first utility. The second set of modules is deployed in a second set of appliances for communicating with the second utility.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device(s). The states in either the passive or active RFID tags can then be read by the microcontroller on the slave device(s) and appropriate functions/actions can be taken based upon these signals.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granularity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting, the cost of the appliance, opening, up appliances to a variety of protocols, enabling demand side management or energy management, and/or providing for a standard interface to the appliance (for example, offering prechill and/or temperature set change during, on-peak hours).

Low cost, reliable RF transmissions within the home, rather than using industrial solutions such as PLC or Zigbee solutions which are significantly more costly than the aforementioned system, are yet another benefit.

Still other features and benefits of the present disclosure will become apparent from reading and understanding the following detailed description.

BRIEF DESCRIPTION OF THE DRAWINGS

FIGS. 1-21 illustrate various systems and methods in accordance with the exemplary embodiments described herein.

DETAILED DESCRIPTION OF THE INVENTION

Figure 1:
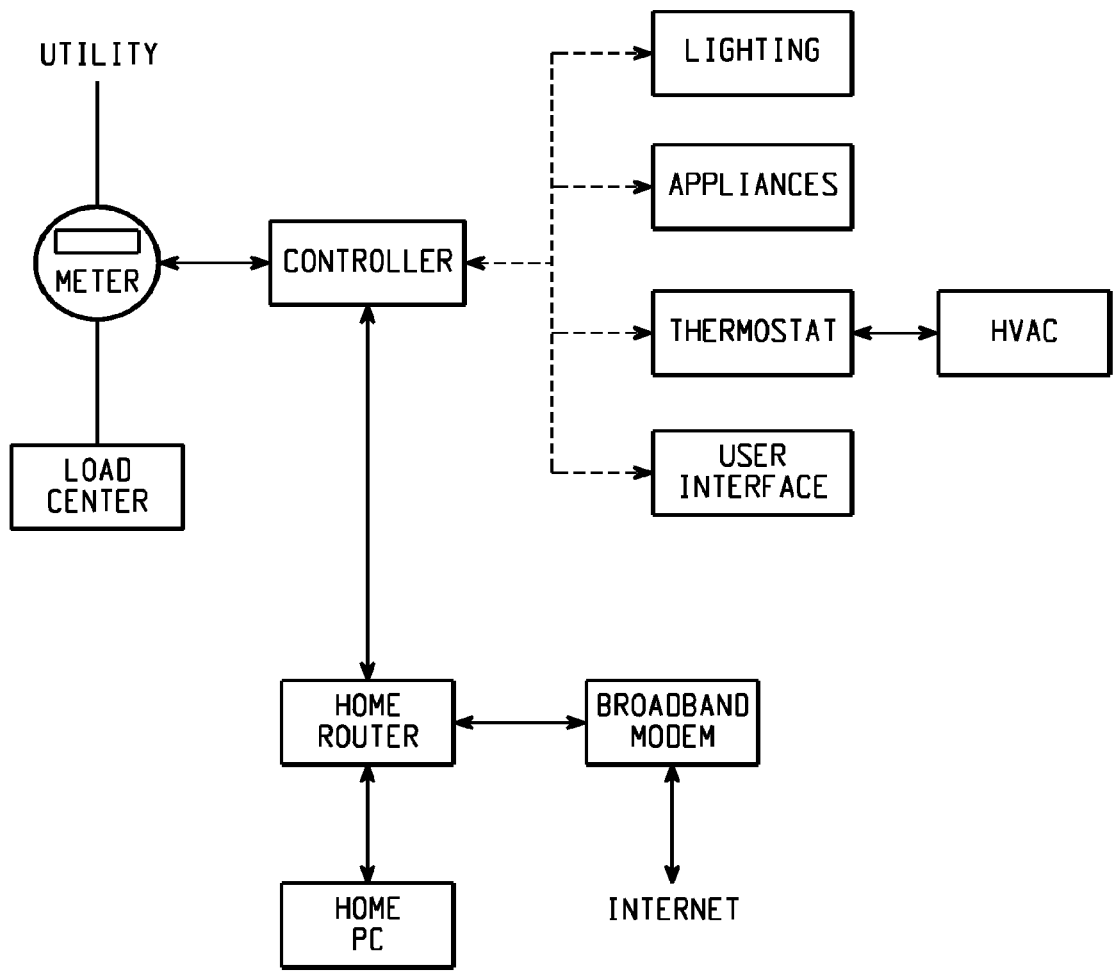
Figure 2:
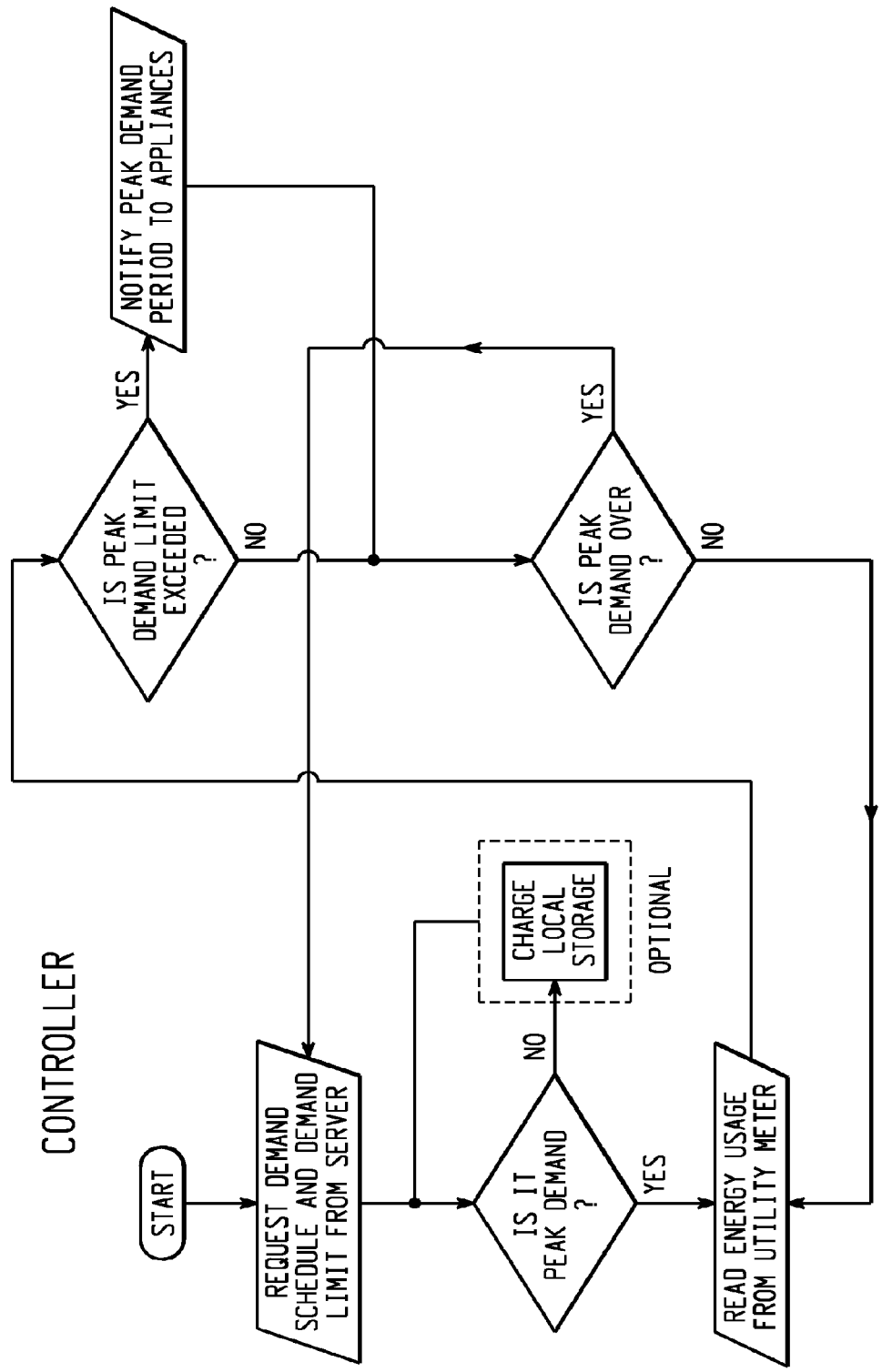

In one embodiment, a more advanced system is provided to handle energy management between the utility and the homeowner's appliances. The system can include one or more of the following: a controller, utility meter, communication network, intelligent appliances, local storage, local generator and/or demand server. Less advanced systems may actually allow the appliance to "communicate directly with the utility meter or mesh network through the DSSM (Demand Side Management Module) (FIG. 1). The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
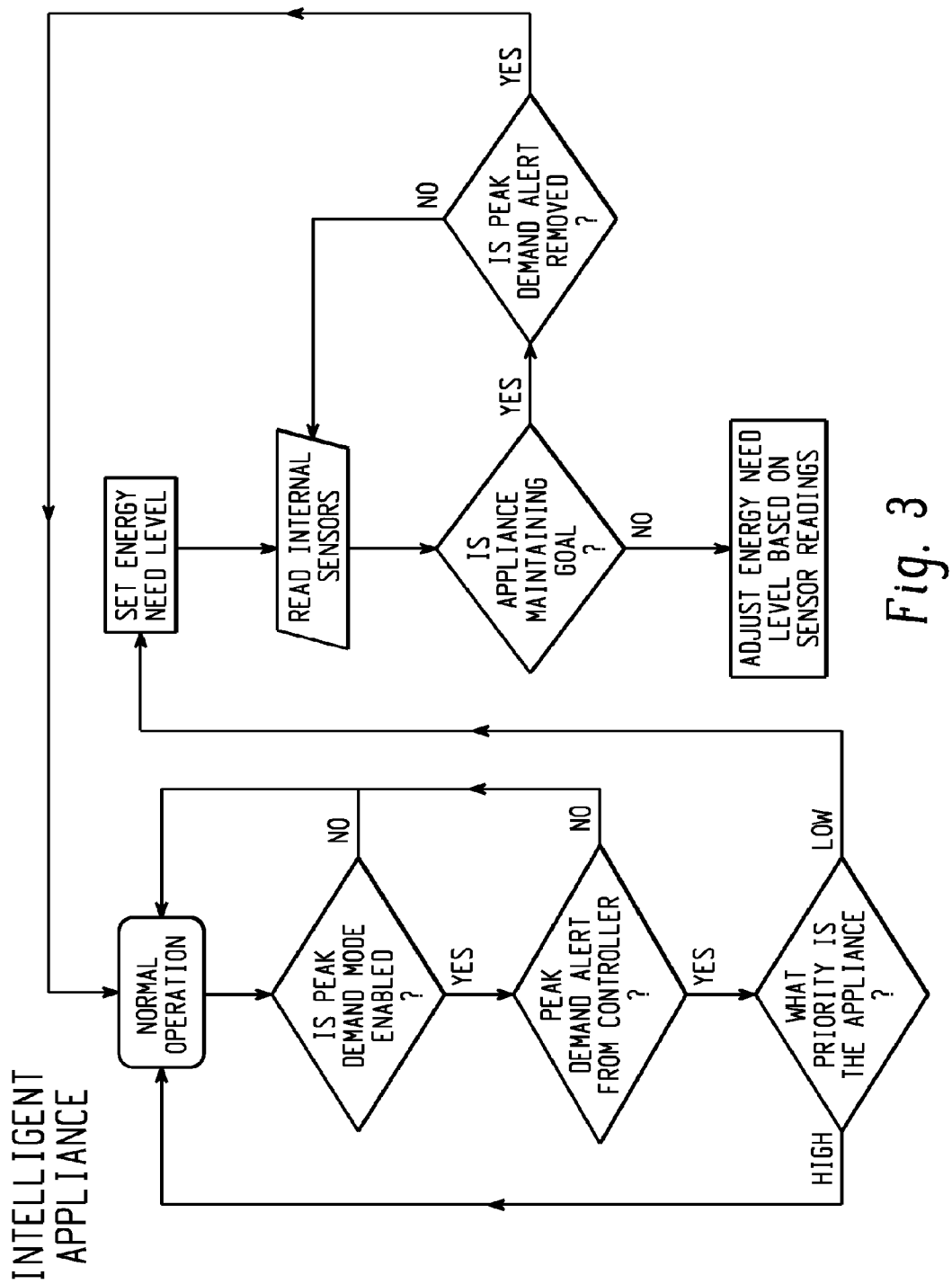

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive MID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
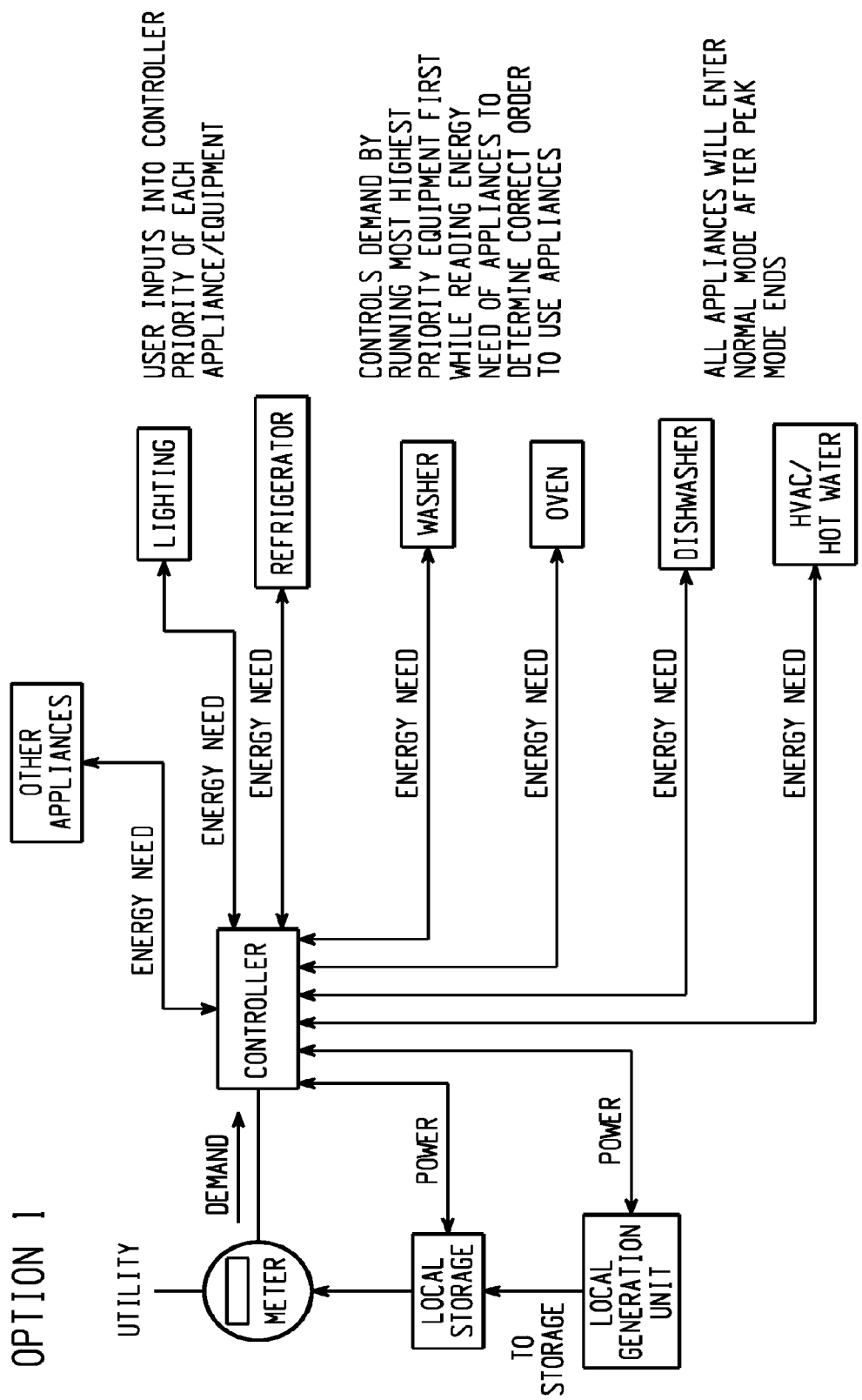

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The priority dictates which appliances have higher priority to be in full or partial energy mode than other appliances. Energy need dictates how much energy is required for a certain time period in other for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating, temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

Figure 5:
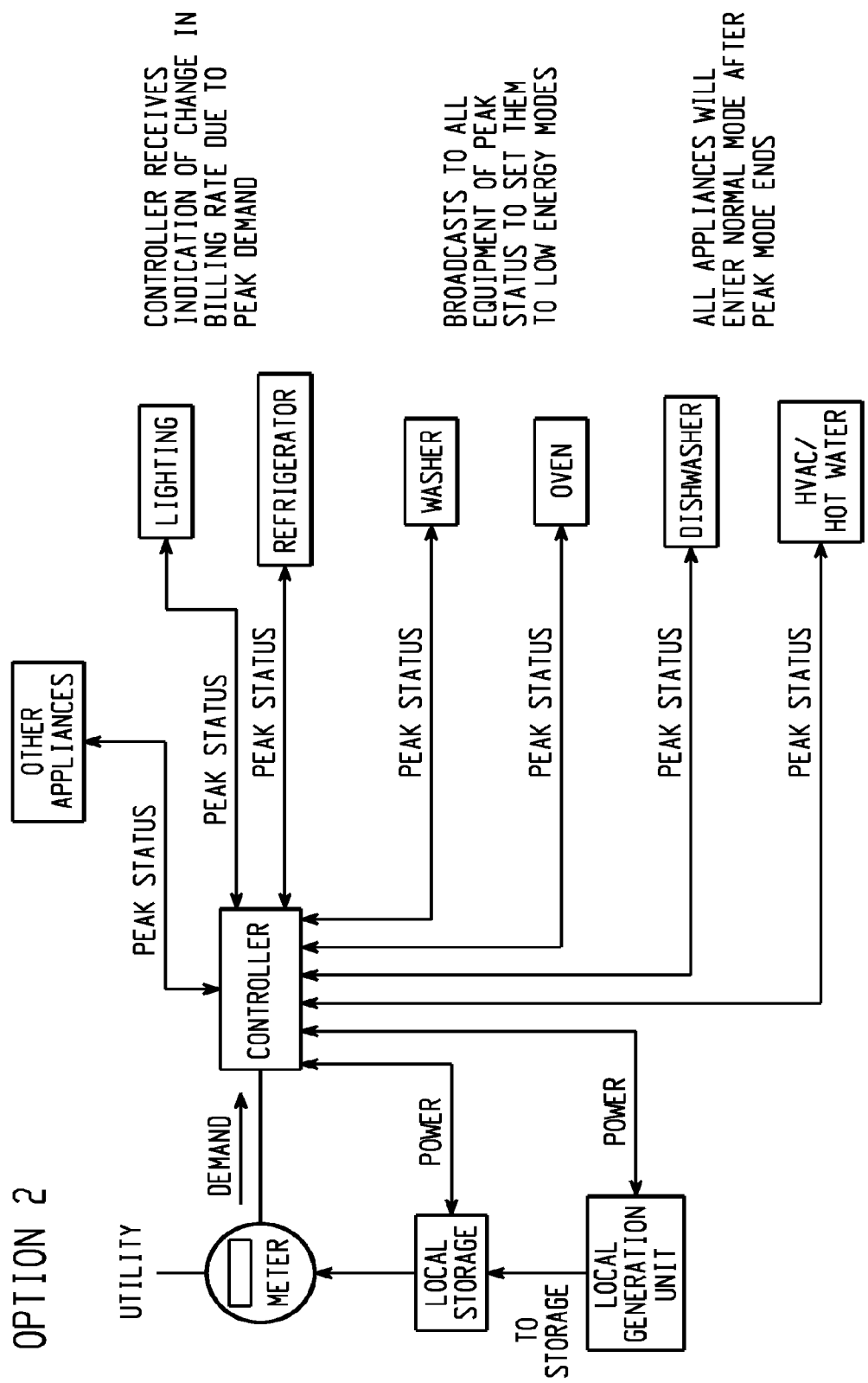

In a second scenario, for example, a set point is provided. During a peak demand period, the controller will tell each appliance to go into peak demand mode (FIG. 5). The appliance will then go into a lower energy mode. The customer can deactivate the energy savings mode by selecting a feature on the appliance front end controls i.e. user interface board) before or during the appliance use or at the controller. The controller can also communicate to a local storage or power generation unit. This local unit is connected to the incoming power supply from the utility. The controller notifies the storage unit to charge when it is not in peak demand, if a storage unit is included and available. If the storage unit has enough energy to supply the appliances during peak demand, then the controller will switch the home's energy consumption from the utility to the storage unit. The unit can also be local generator/storage such as solar, hydrogen fuel cell, etc.

Figure 6:
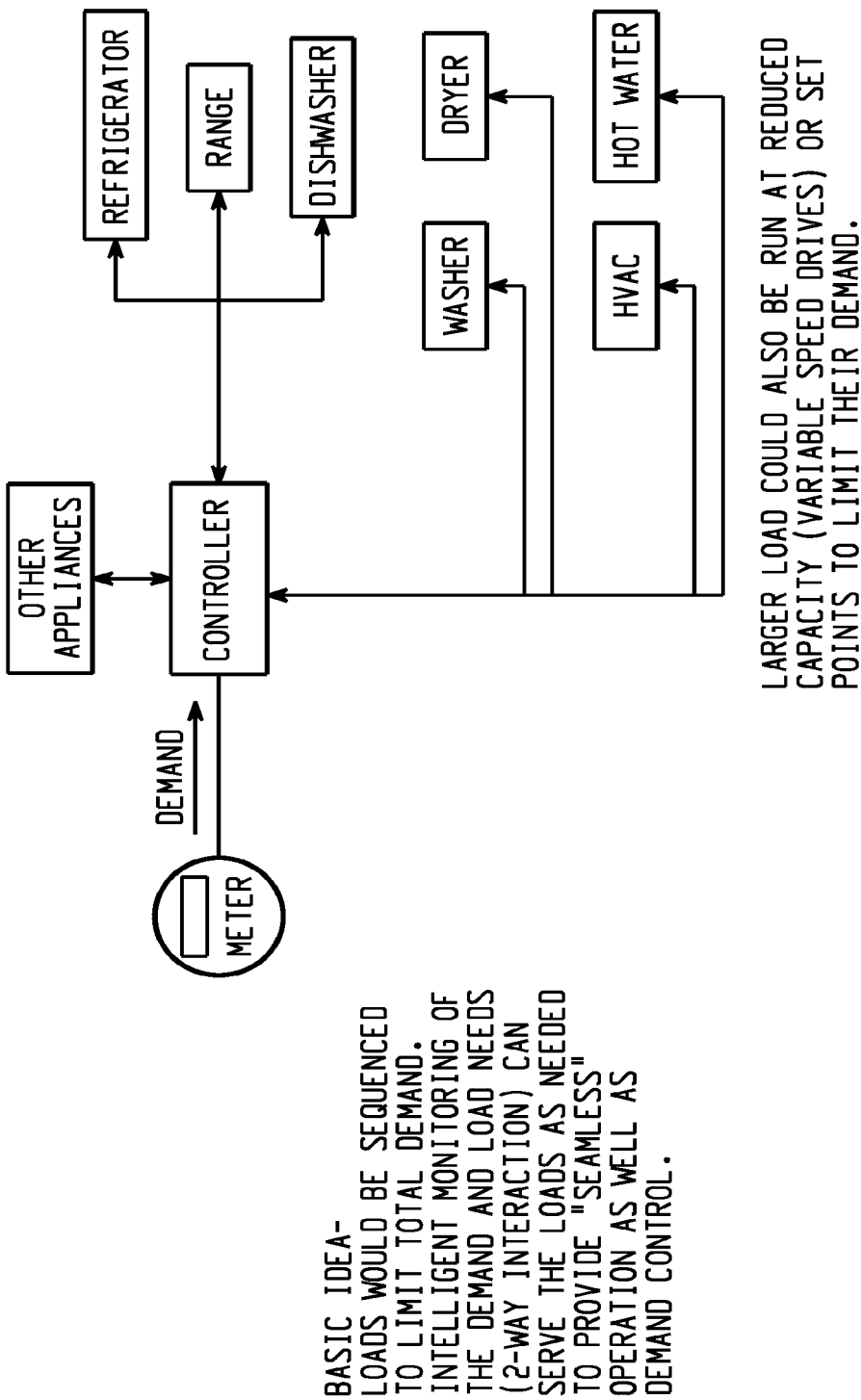
Figure 7:
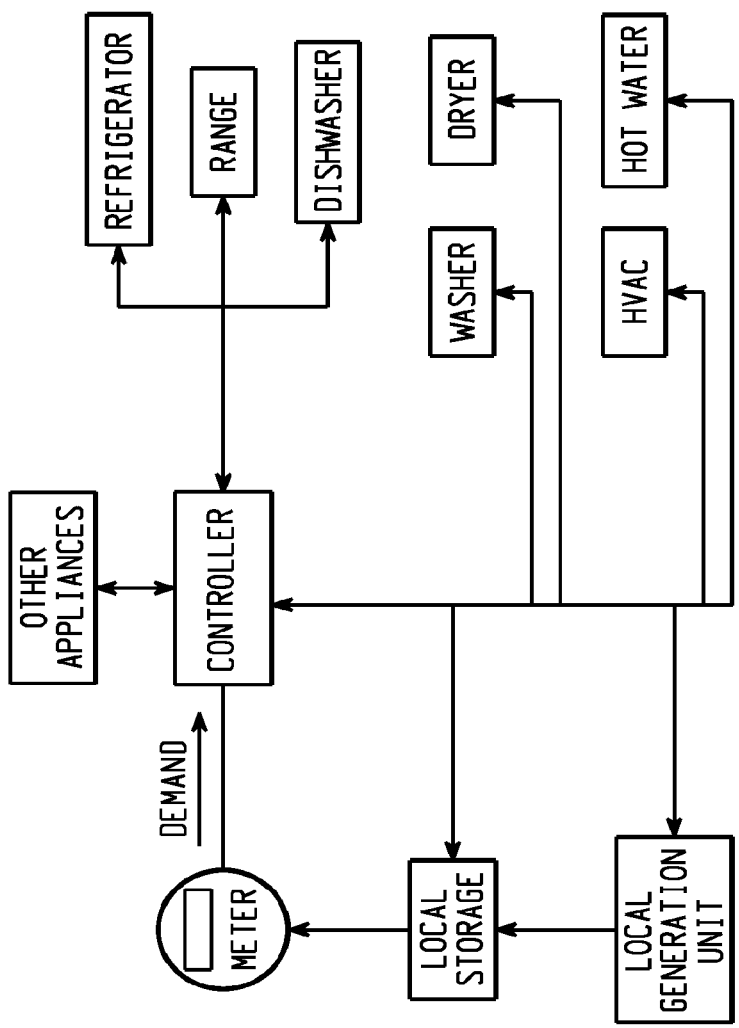
Figure 8:
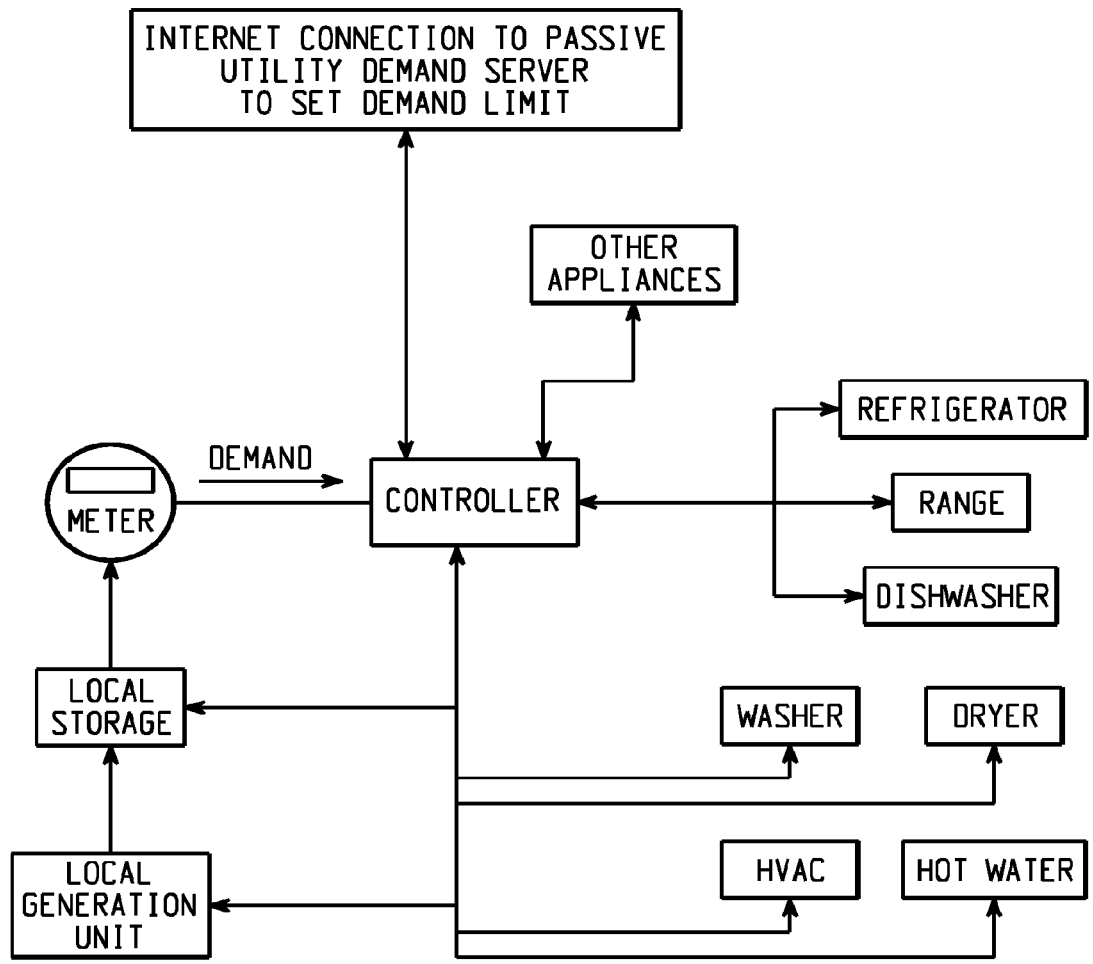

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8).

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed, to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during, on-peak time. Other power load reducing measures in a refrigerator may include (reducing before on-peak hours) the temperature of the freezer and refrigerator compartments in a refrigerator (pre-chill) and slightly increase temperature setting, during, on-peak rates. For example, just before peak rate time, the temperature setting could be decreased by 1-2 degrees during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Figure 12:
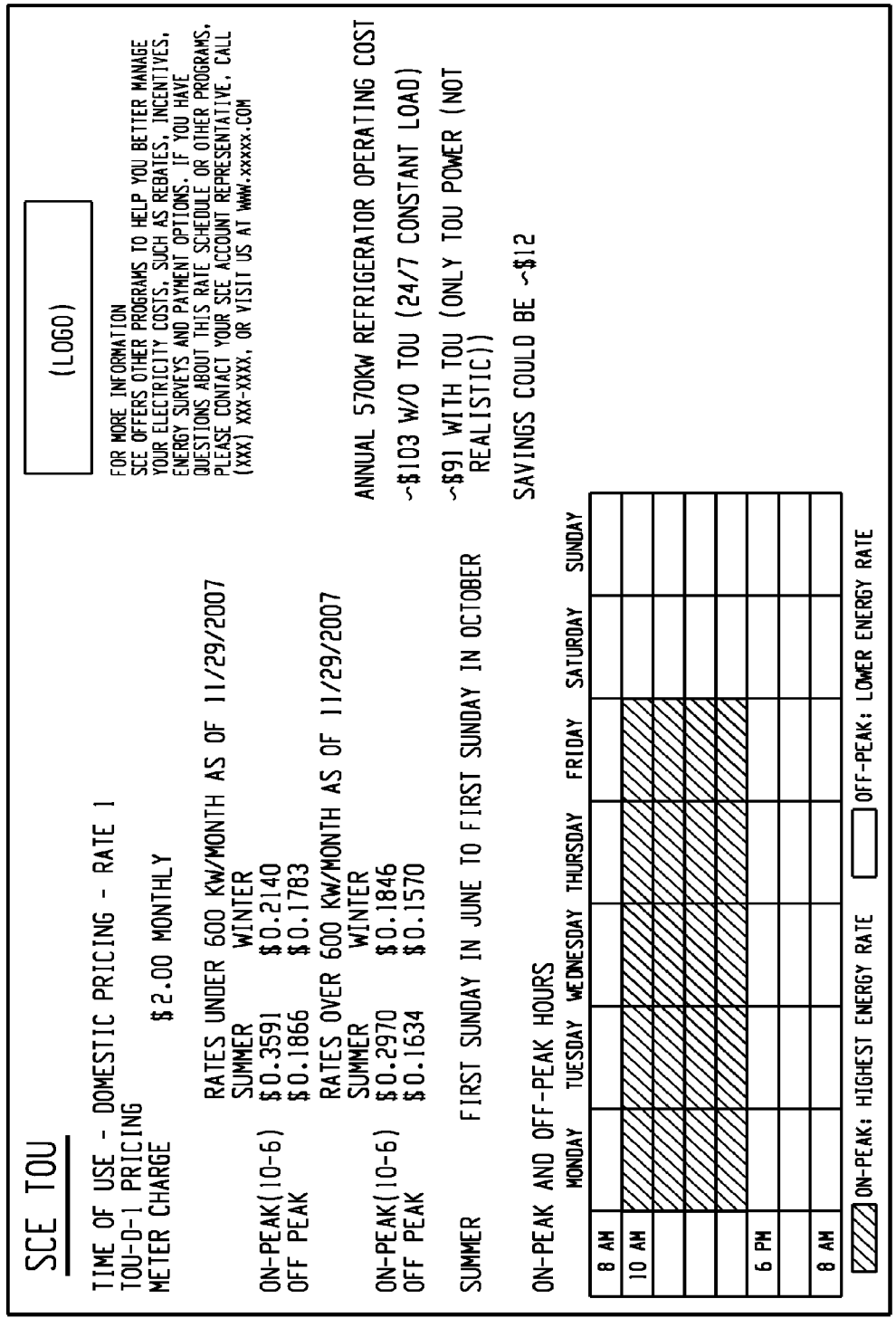
Figure 14:
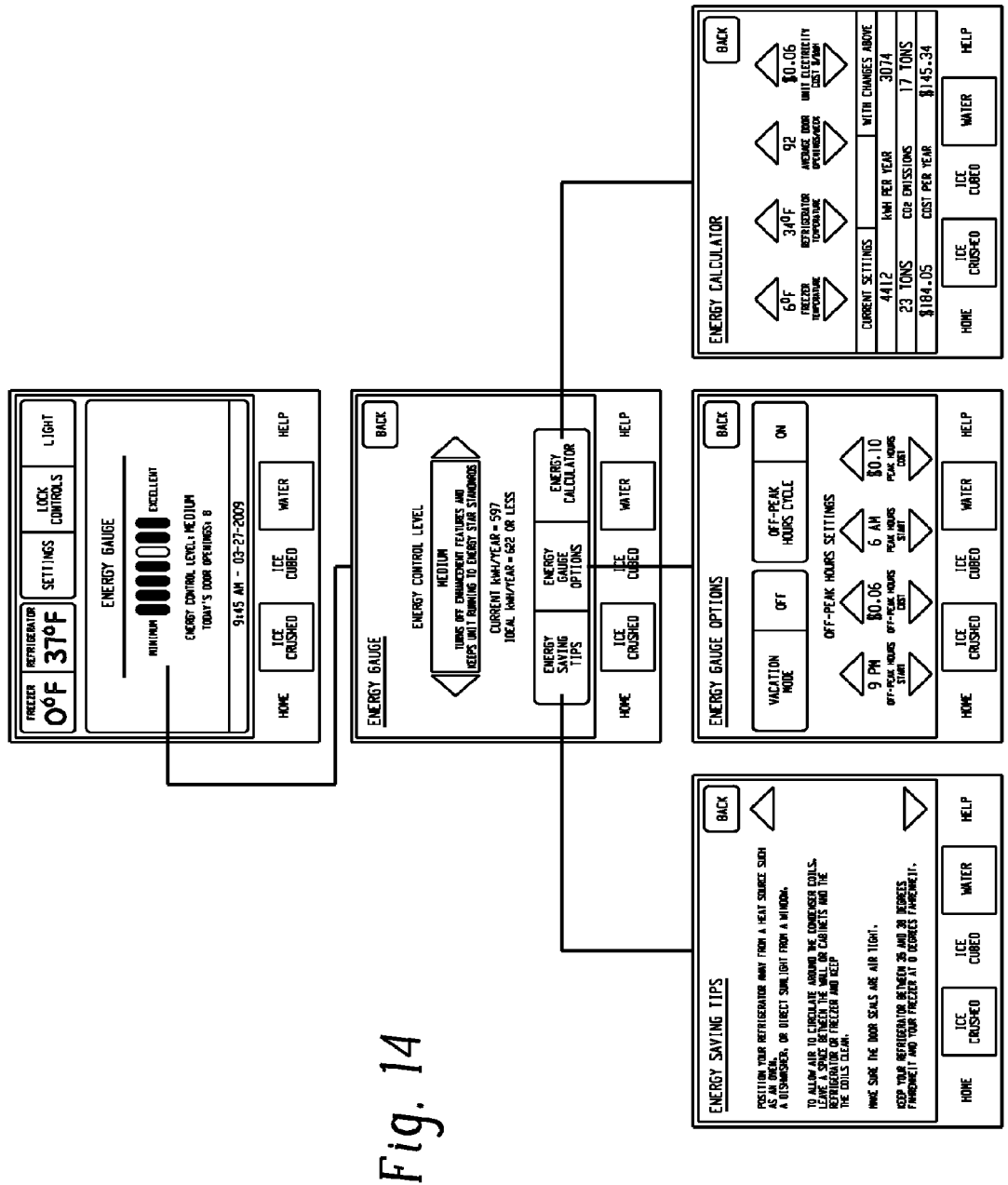
Figure 15:
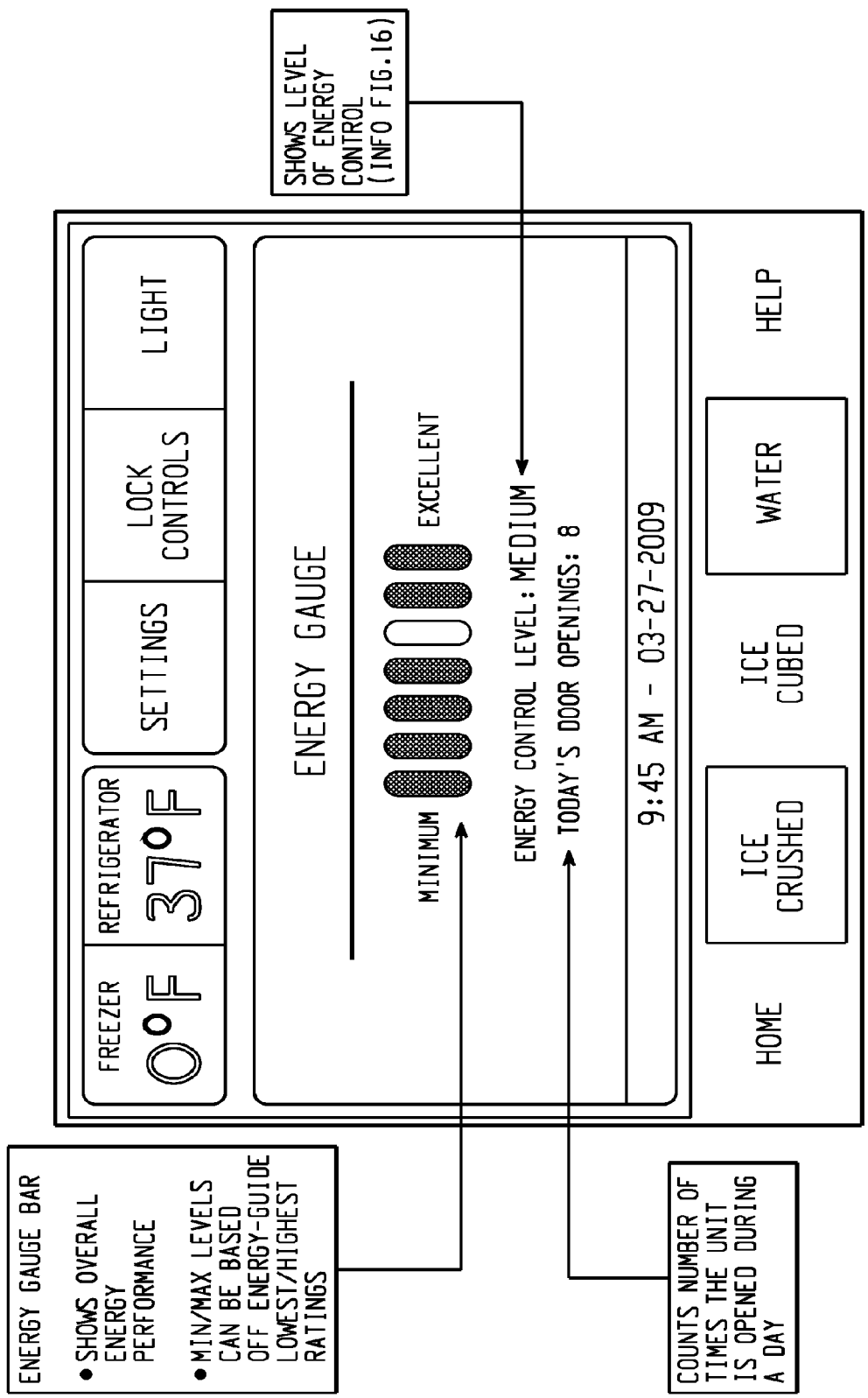
Figure 16:
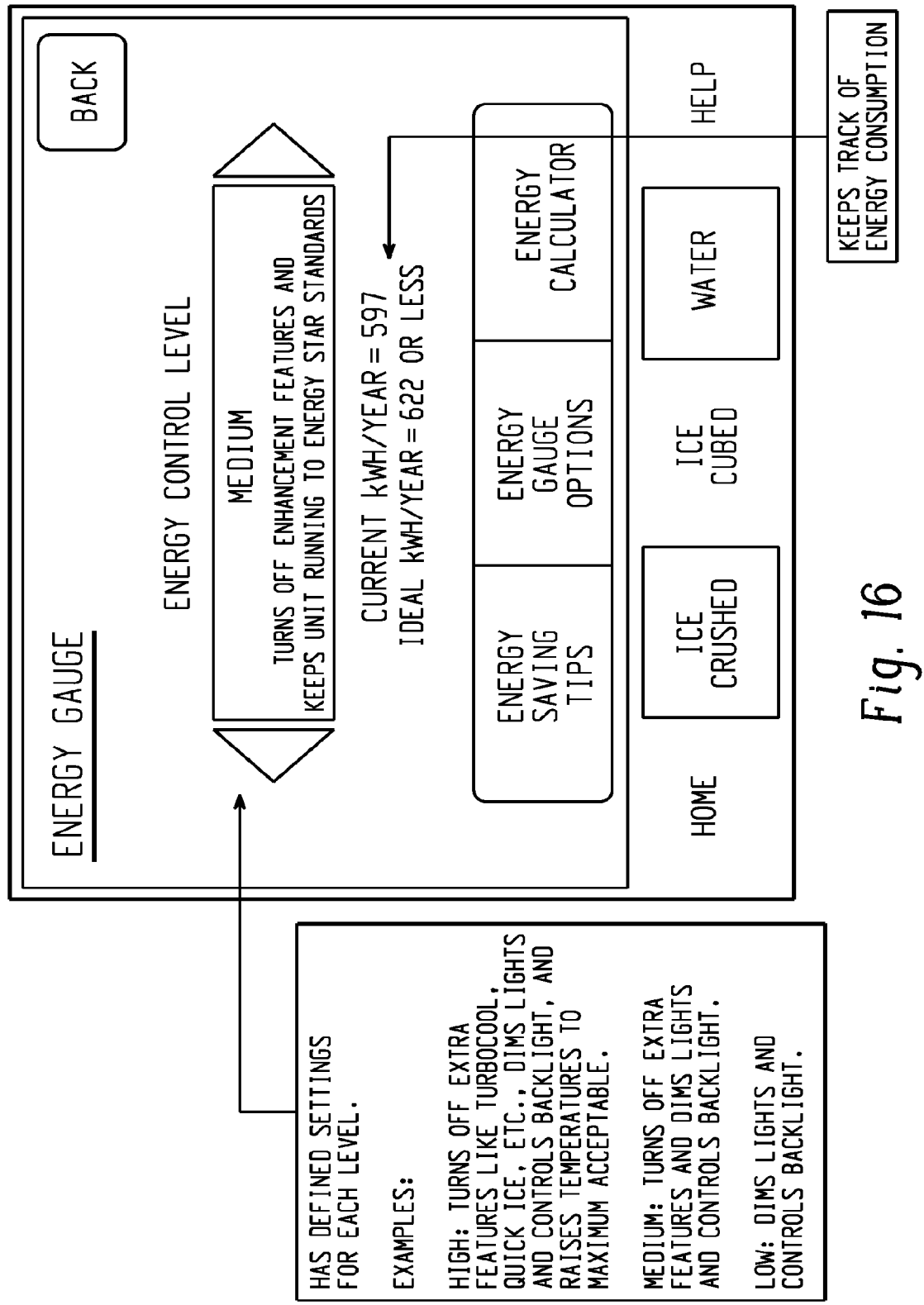
Figure 17:
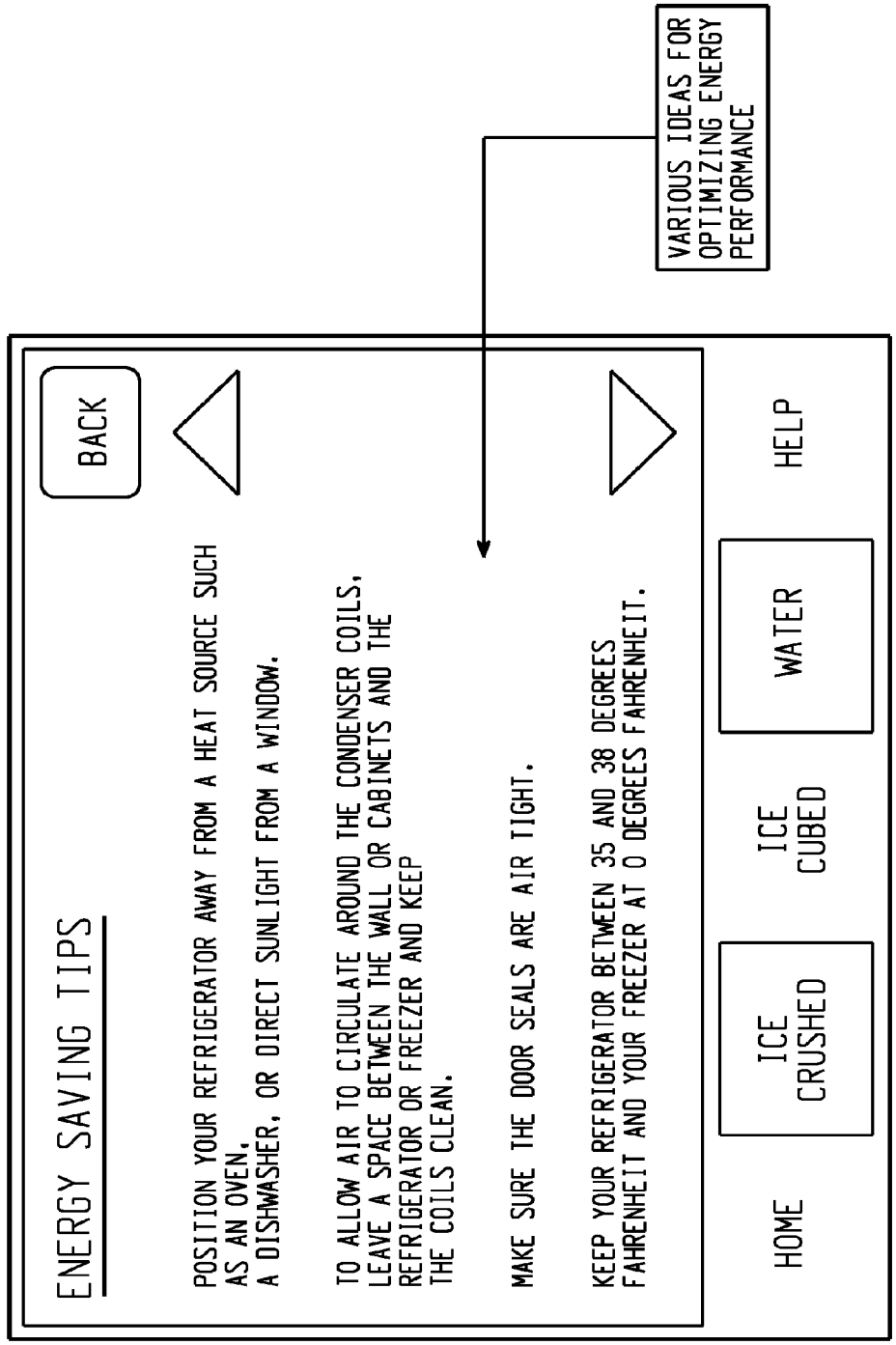
Figure 18:
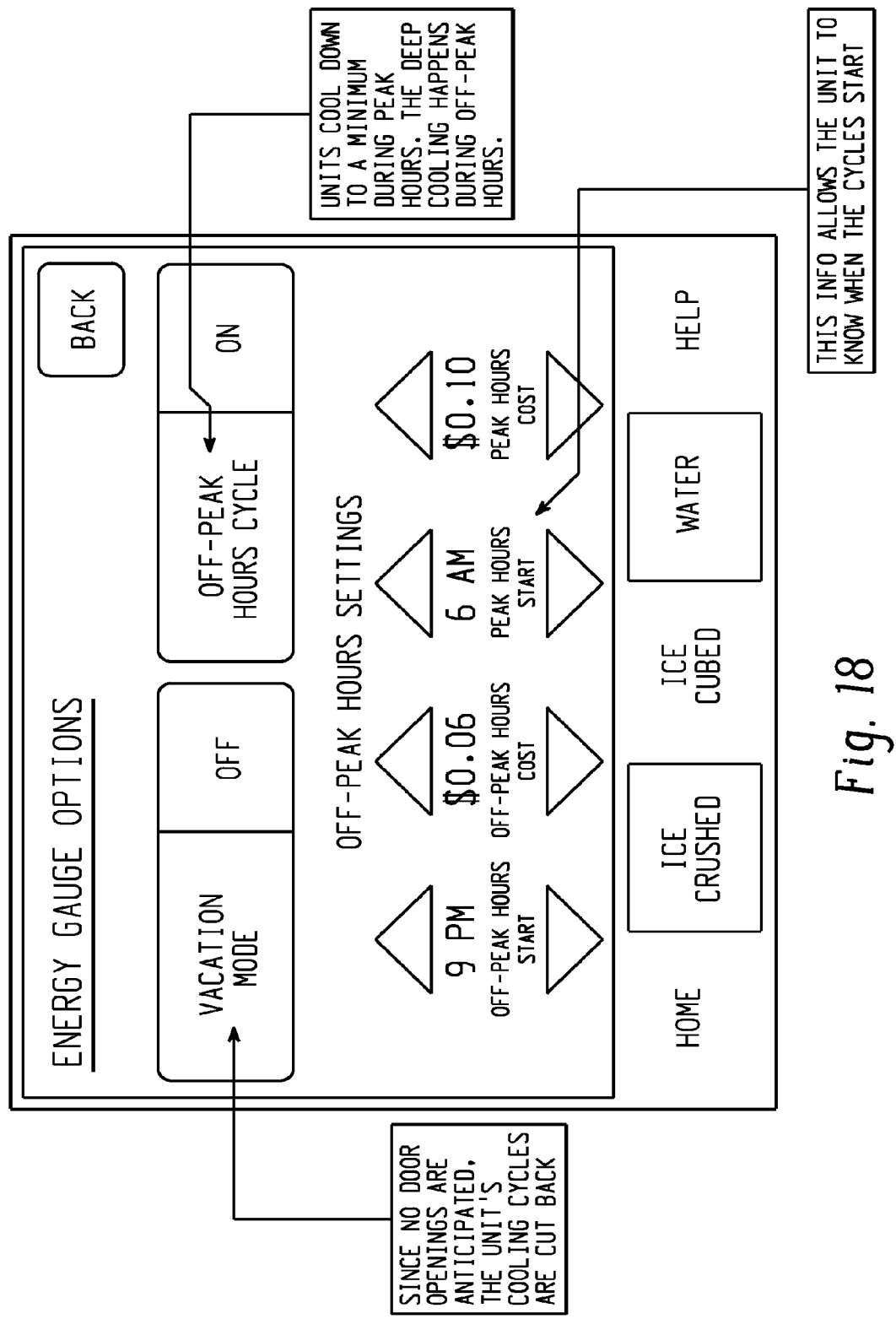
Figure 19:
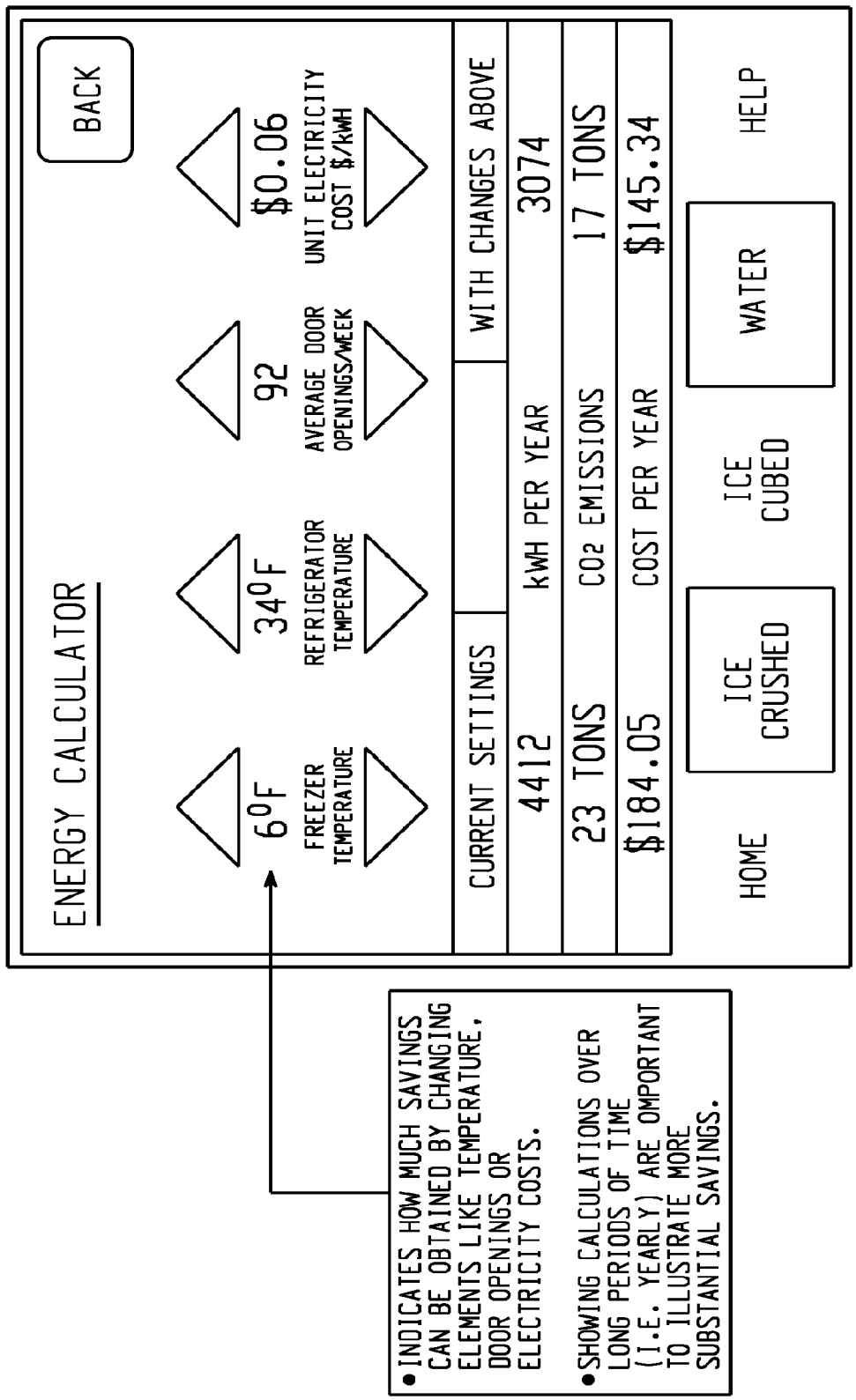

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand is an enable/disable menu, or to provide input selection such as entry of a zip code (FIG. 10) in order to select the utility company and time of use schedule (FIG. 11), or using a time versus day of the week schedule input method (FIGS. 12-13).

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (FIGS. 14-19).

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20), FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating, that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

Figure 22:
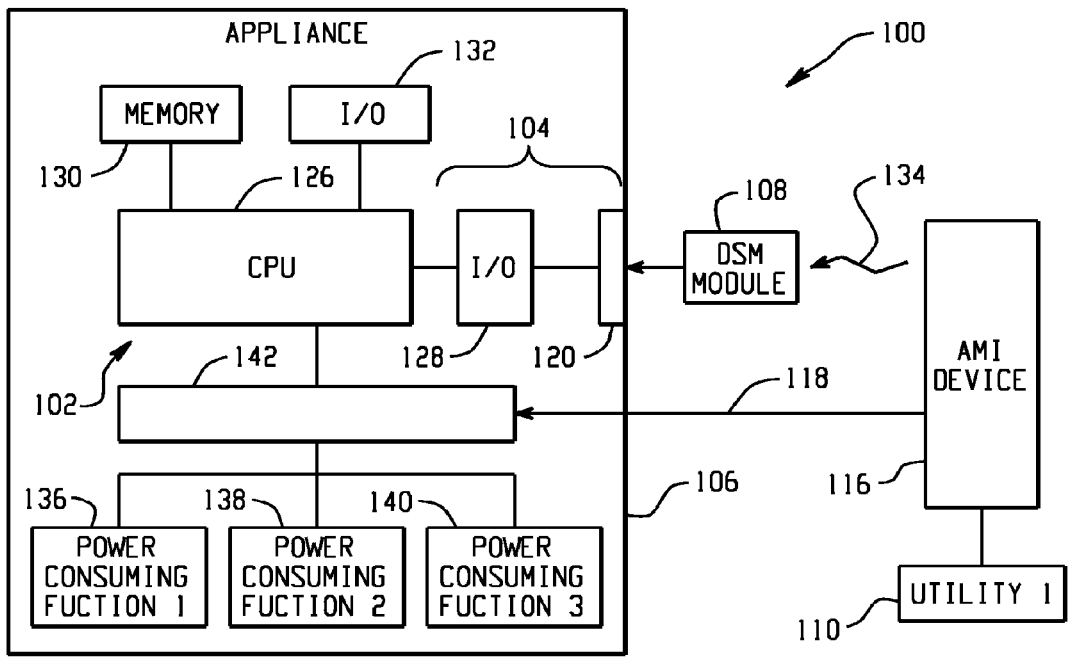
FIG. 22 is a schematic view of a household appliance system including an appliance control system having a common appliance interface provided on an appliance in the demand side module connected to the common appliance interface.

With reference to FIG. 22, a household appliance system is shown, and generally designated by reference numeral 100. The system 100 includes an appliance control system 102 having a common appliance interface 104 provided on an appliance 106. The appliance 106 can be, for example, a refrigerator, a dishwasher, an oven or range, a microwave, a washer, a dryer, or some other appliance. A demand side management (DSM) module 108 is connected (or connectable) to the common appliance interface 104. The module 108 can correspond to one select utility (e.g., a first utility 110) of a plurality of utilities, for example, electrical utility, gas utility, water utility, etc. (e.g., first utility 110, second utility 112 of FIG. 23 and third utility 114 of FIG. 24) and adapted to communicate with the one select utility of the plurality of utilities, e.g. selecting one of plural utilities based on zip code. As will be described in more detail below, the appliance control system 102 operates the appliance 106 based on communications with the one select utility 110 through the module 108.

While many configurations are possible, the embodiment illustrated in FIG. 22 shows the one select utility 110 including an advanced metering infrastructure (AMI) device 116 that communicates directly with the DSM module 108. For example, the AMI device 116 could be an electric meter that both communicates with the DSM module 108 and provides power to the appliance 106, such as via power supply line 118. While the power supply line 118 in FIG. 22 is shown as passing separately to the appliance 106 (i.e., not through the DSM module 108), it will be appreciated that other configurations could be employed, including having the power supply line 118 pass through the DSM module 108, for example. Also shown in the illustrated embodiment, the DSM module 108 can be received in a recessed receptacle 120 of the common appliance interface 104. For example, the module 108 can be removably connected to the common appliance interface 104 via the recessed receptacle 120, though other arrangements could be employed.

The appliance control system 102 can include a CPU 126 connected to the common appliance interface 104, particularly to an input/output interface 128 which itself is connected to the recessed receptacle 120, for communications with the module 108. The CPU 126 can also be connected to or include a memory 130 and, depending on the particular appliance, can include another input/output interface 132. The input/output interface 132 could include, for example, a display unit and/or an input unit. In one exemplary embodiment, the input/output interface 132 includes a display, which can be a touch screen display, and/or includes buttons for receiving user input, for example, a consumer can enter a zip code or other pertinent information or data into the control system. Based on communications 134 received from the AMI device 116 concerning the first utility 110, the control system 102, and particularly the CPU 126, can control power delivery, such as from power input line 118, to one or more power consuming functions, such as a first power consuming function 136, a second power consuming function 138, and a third power consuming function 140. In the illustrated embodiment, controlling of power from the power input line 118 to the power consuming functions 136, 138, 140 occurs through a power distribution module 142, which can be integrally provided with the CPU 126 or separately provided as shown in the illustrated embodiment.

The DSM module 108 can be one particularly selected due to its compatibility for communicating with the AMI device 116, for example receiving communications 134 from the AMI device 116. Communications 134 between the module 108 and the utility 110 through the AMI device 116 can be carried on via at least one of the following hardwired or wireless communication protocols: e.g., PLC, SM, AM SSB, WiFi, ZibBee, Radio Broadcast Data System, IEEE 802.11 standard compatible, or IEEE 802.15.4 standard compatible, or still other communication systems may be used without departing from the scope and intent of the present disclosure. Accordingly, if the utility 110 preferably communicates through the AMI device 116 by a particular wireless broadcast, the DSM module 108 can be one selected for receiving communications 134 of the same wireless broadcast type.

Figure 23:
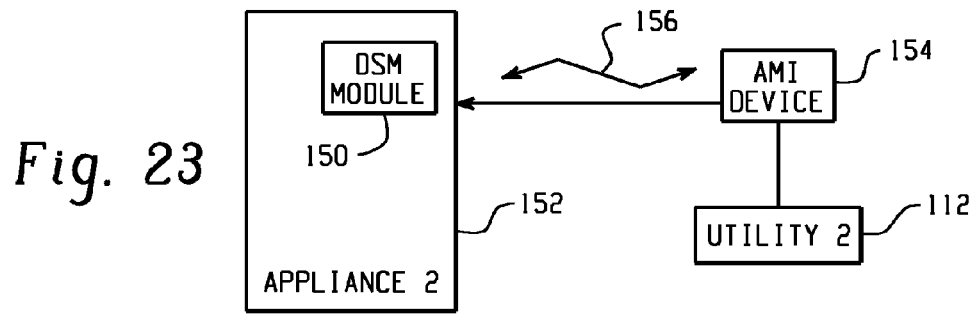
FIG. 23 is a schematic view of an appliance having an integral demand side management module configured for two-way communications with an advanced metering infrastructure (AMI) device connected to a utility.

In an alternate configuration, and with reference to FIG. 23, the DSM module 150 is shown in an appliance 152 wherein the module 150 is an integral mounted module, which can be integrally mounted inside (i.e., internal to the appliance) and/or outside (i.e., external to the appliance) the appliance 152. Also shown in FIG. 23 is an alternate configuration wherein the module 150 communicates with AMI device 154 associated with the utility 112 through two-way communications 156. Such two-way communications can be any of those discussed above in connection with the module 108 suitable for two-way communications.

Figure 24:
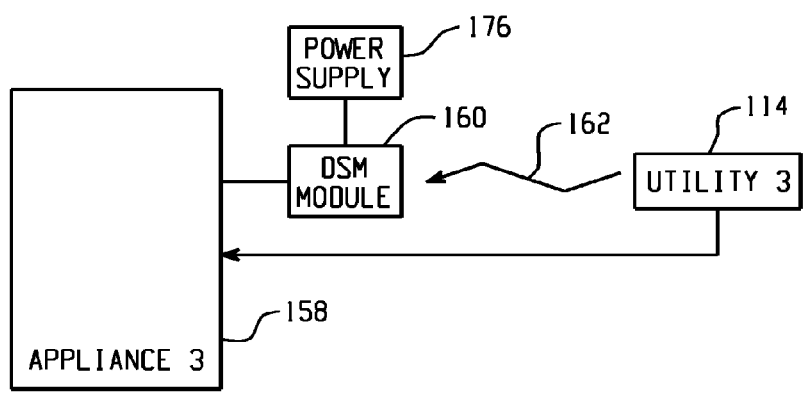
FIG. 24 is a schematic view of an appliance having a demand side management module configured to receive one-way communications from a utility.

With reference to FIG. 24, still another alternate configuration is shown including an appliance 158 having a DSM module 160 that receives communications in association with a third utility 114. In this configuration, communications 162 to the module 160 can occur directly from the utility 114. For example, the utility 114 could broadcast over FM, AM SSB, or a radio broadcast data system, or over an other suitable communications protocol that allows direct communications from the utility 114 to the DSM module 160.

Figure 28:
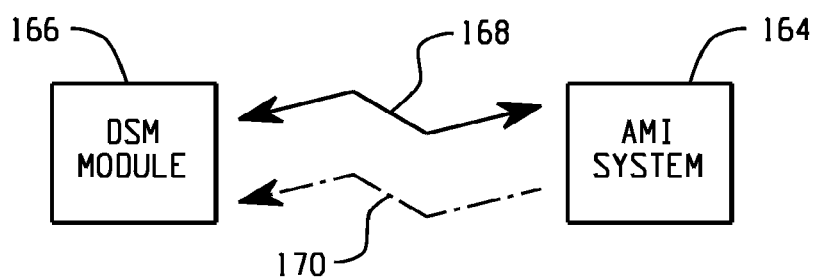
FIG. 28 is a schematic diagram of a demand side module communicating with an advanced metering infrastructure (AMI) system.

From the various arrangements depicted herein, it should be appreciated that the DSM module (e.g., modules 108, 150, 160) are all configured and selected such that they are capable of communicating with an AMI system, such as AMI system 164, schematically illustrated in FIG. 28. The module, such as module 166, can further be selected depending on the particular type of communications desired, for example, two-way communications 168 or one-way communications 170. Returning reference to FIG. 1, the appliance control system 102 can operate the appliance 106 in one of several states of operation based on the communications with the selected one utility 112 through the module 108. For example, the several states of operation can include a normal state and at least one of a low energy mode and a lower energy mode. By way of example, either of a low energy mode or the lower energy mode can include reducing or cutting power to at least one power consuming function, such as power consuming functions 136, 138, 140, of the appliance 106. Example power consuming functions are shown in FIG. 20 when the appliance 106 is a refrigerator. In one exemplary embodiment, the control system 102 can operate the appliance 106 in the low energy mode or the lower energy mode when the communications 134 with the select one utility 110 through the module 108 indicate that the select one utility 110 is providing power at a higher rate of at least two rates (e.g., peak power rate and a normal power rate) of a power rate cost schedule.

The module 108 can be powered from at least one of the appliance 106 or a separate power supply, for example in the embodiment illustrated in FIG. 22, the DSM module 108 can be powered by the appliance 106. In the embodiment illustrated in FIG. 24, the module 160 can be powered by a separate power supply 176, which could be a conventional 110 volt AC outlet, for example. In addition, or in the alternative, the separate power supply 176 could include rechargeable batteries that power the module 160. If desired, the module 108 for example, can be powered from the appliance, such as appliance 106, and is turned off by the appliance 106 until the appliance needs to make a decision about power usage related to the appliance. In one exemplary embodiment, the module 108 is powered from a separate power supply and the appliance control system 102 operates the appliance 106 in a low energy state, or a sleep mode, while the module 106 communicates with the one select utility 110.

Figure 25:
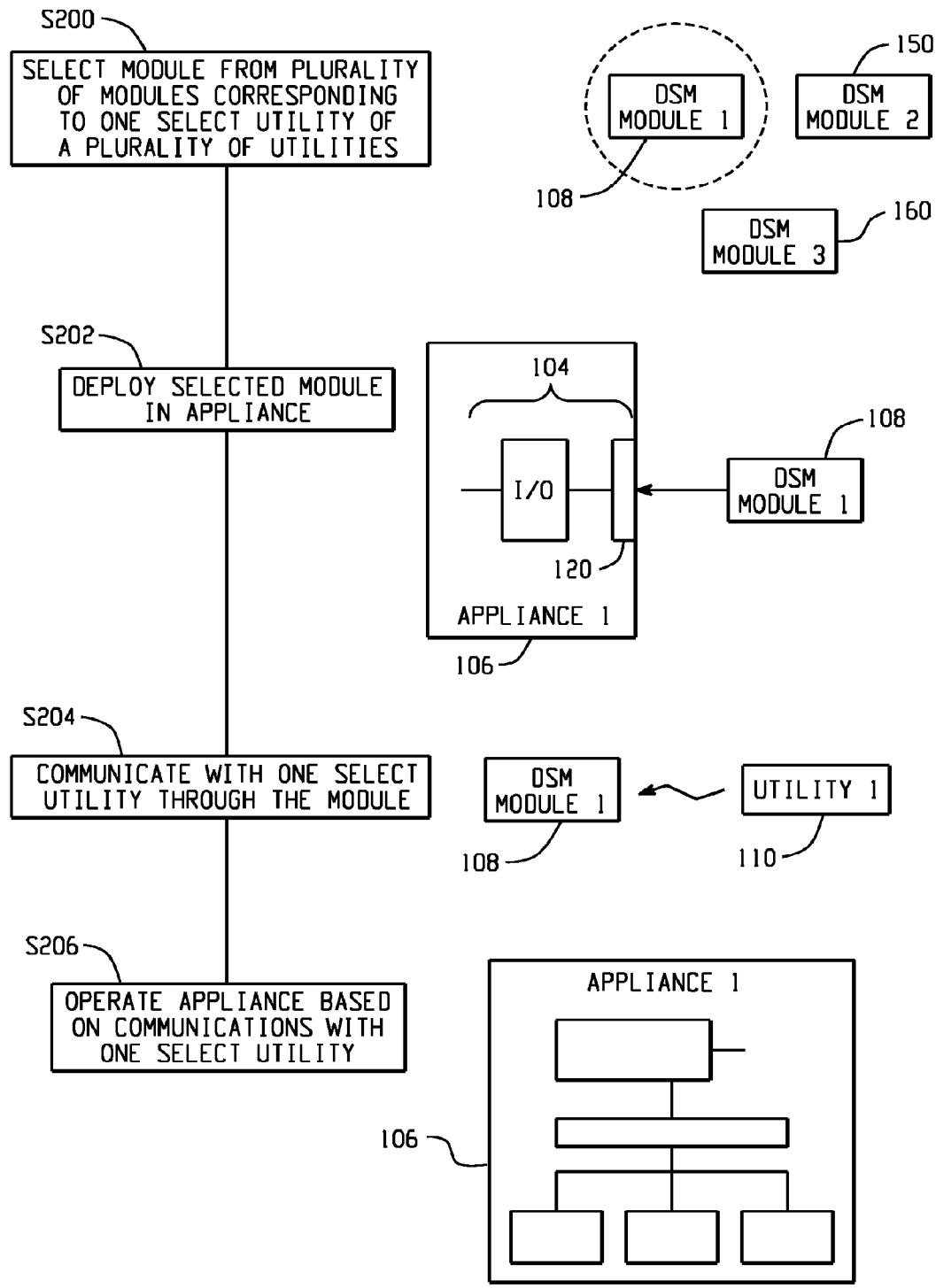
FIG. 25 is a process diagram illustrating a method for configuring, an appliance to communicate with one select utility of a plurality of utilities.

With reference to FIG. 25, a method for configuring an appliance to communicate with one select utility of a plurality of power utilities is illustrated e.g., an electric utility, water utility, gas utility, etc., and second ones of an electric utility, water utility, or gas utility, etc). At S200, module 108 is selected from a plurality of modules, such as modules 108, 150, 160 and/or other modules (not shown). In S202 the selected module 108 is deployed in an appliance, such as appliance 106. For example, deploying the selected module 108 in the appliance 106 can include installing the module 108 in recess receptacle 120, such as removably installing the module 108 in the recess receptacle 120 through the common appliance interface 104. Once deployed, the appliance 106 can communicate with the one select utility 110 (e.g., a particular one of perhaps multiple electrical or other types of utilities) through the module 108 as indicated in S204. Thereafter, the appliance 106 can be operated as already described herein based on the communications with the select one utility 110 as indicated at S206.

Figure 26:
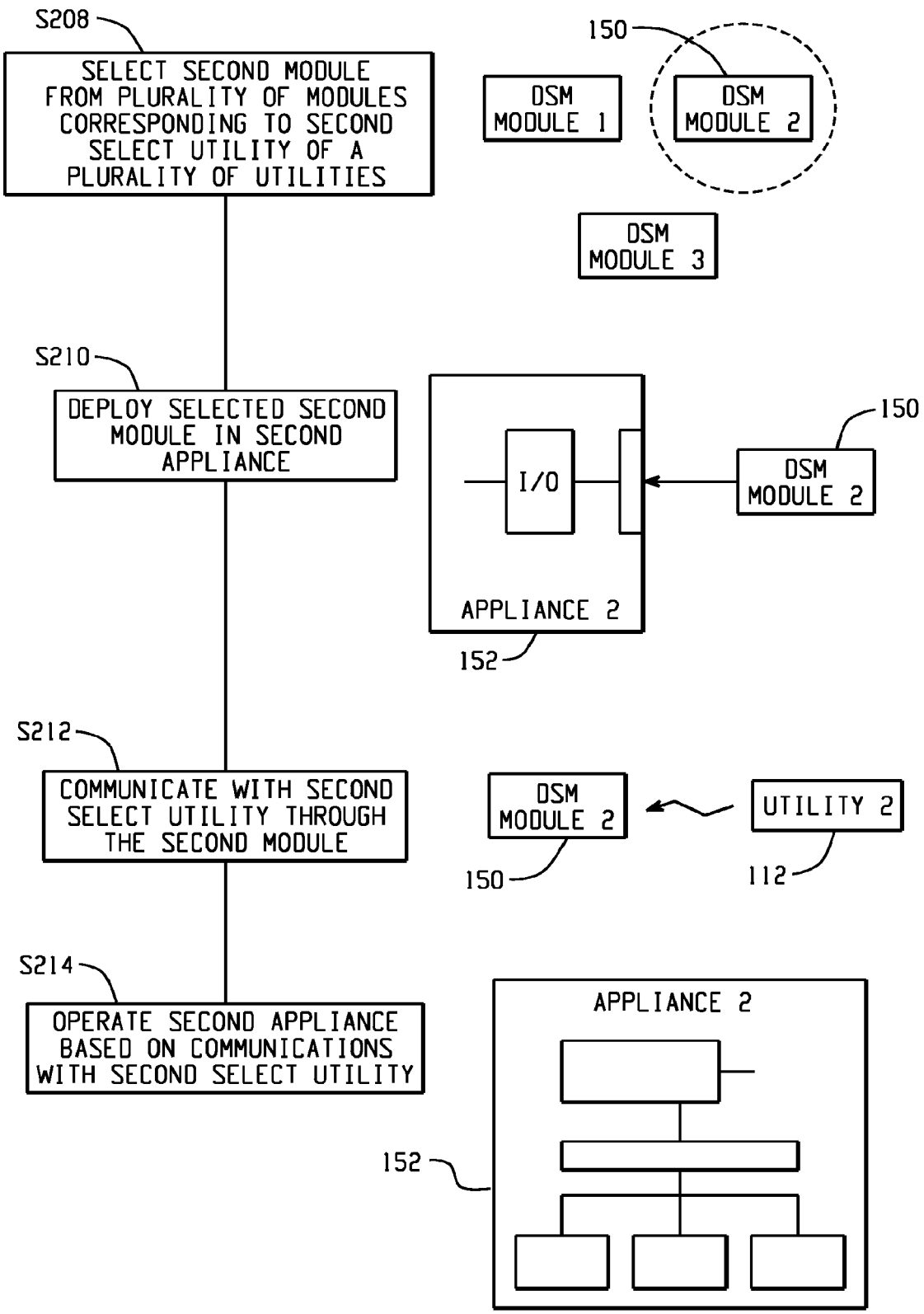
FIG. 26 is process flow diagram illustrating further steps for the method of FIG. 25.

Turning to FIG. 26, a second module, such as module 150, can be selected from the plurality of modules, such as modules 108, 150, 160 and/or other modules (not shown), the second module 150 corresponding to a second select utility (a different one of perhaps multiple electrical or other types of utilities), such as utility 112, of a plurality of utilities as indicated at S208. The selected second module 150 can be deployed in a second appliance, such as appliance 152 in the same manner as described reference to the module 108 being deployed in the appliance 106 as indicated at S210. Once deployed, the appliance 152 can communicate with the second select, utility 112 through the second module 150 as indicated at S212. Next, the second appliance 152 can be operated based on the communications with the second select utility 112 as indicated at S214.

As described above, communications with the utilities, such as at S204 and S212, can occur through the respective modules 108, 150 using an accepted communication protocols, which may include: PLC, FM AM SSB, WiFi, ZibBee, Radio Broadcast Data System, IEEE 802.11 standard compatible, or IEEE 802.15.4 standard compatible. Operating the appliance based on the communications, such as at S206 and S214, can include operating the appliance in at least one of a low energy mode and a lower energy mode. For example, operating the appliance based on communications with one of the utilities 110, 112 can include reducing or cutting power to at least one power consuming function of the appliance.

Figure 27:
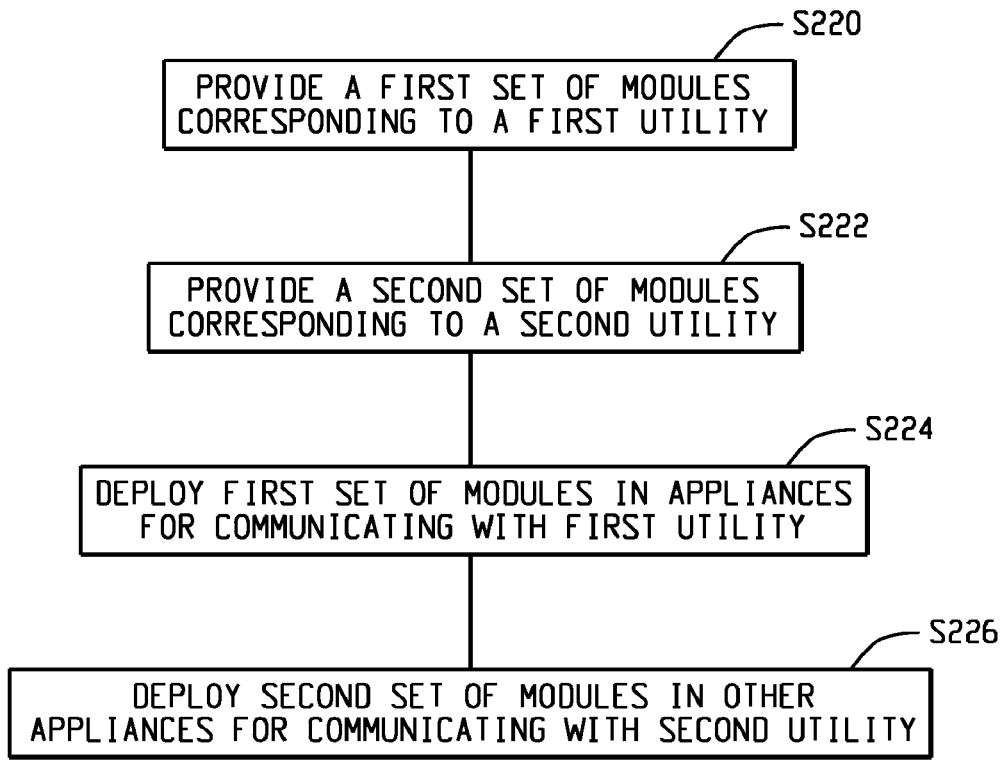
FIG. 27 is a process flow diagram illustrating a method for configuring appliances to communicate with utilities.

Turning to FIG. 27, a method for configuring appliance to communicate with power utilities is shown. In particular, at S220 a first set of modules corresponding to a first utility (e.g., a first electric utility) is provided. At S222, a second set of modules corresponding to a second utility (e.g., a second electric utility) is provided. The first set of modules can correspond to the first utility, particularly in that they are pre-adapted to communicate with the first utility. Likewise, the second set of modules can be such that they are pre-adapted to communicate with the second utility. As described in S202 and S210, the first set of modules from S220 can be deployed in a first set of appliances fix communicating with a first utility (S224). Similarly, a second set of modules can be deployed in a second set of appliances for communicating with a second utility (S226). Once deployed, the first set of appliances can communicate with the first set of modules using a first communication protocol and the second set of appliances can communicate with the second utility through the second set of modules using a second, different communication protocol.

The invention has been described with reference to the preferred embodiments. Obviously, modifications and alterations will occur to others upon reading and understanding the preceding detailed description. For example, it is understood that a first utility can be one of many different types of utilities and likewise a second utility ca) be one of many different types of utilities, as well as referring to the situation where the first and second utilities are the same type of utility e.g., both electric) but different companies or suppliers. It is intended that the invention be construed as including all such modifications and alterations.

What is claimed is:

1. A household appliance system, comprising:
   an appliance control system having a common appliance interface provided on an appliance;
   a demand side management module connected to the common appliance interface, the module corresponding to one select utility of an associated plurality of utilities and configured to communicate with the one select utility, wherein the appliance control system operates the appliance based on communications with the one select utility through the module;
   the appliance control system configured to operate the appliance in one of several states of operation including a normal state and at least one of a low energy and a lower energy mode; and
   the appliance control system being configured to operate the appliance in the low energy mode or the lower energy mode when the communications with the one select utility indicate the one select utility is providing power at a higher rate of a power rate cost schedule.

2. The household appliance system of claim 1 wherein the module is removably connected to the common appliance interface.

3. The household appliance system of claim 1 wherein the communications between the module and one select utility are carried on via at least one of the following communication protocols: PLC, FM, AM SSB, WiFi, ZigBee, Radio Broadcast Data System, IEEE 802.11 standard compatible, or IEEE 802.15.4 standard compatible.

4. The household appliance control system of claim 1 wherein the low energy mode and the lower energy mode include reducing or cutting power to at least one power consuming function of the appliance.

5. The household appliance control system of claim 1 wherein the one select utility includes an AMI device that communicates directly with the module.

6. The household appliance control system of claim 5 wherein the AMI device is an electric meter.

7. The household appliance control system of claim 1 wherein the module is powered from at least one of the appliance or a separate power supply.

8. The household appliance control system of claim 7 wherein the separate power supply includes rechargeable batteries that power the module.

9. A household appliance system, comprising:
an appliance control system having a common appliance interface provided on an appliance;
a demand side management module connected to the common appliance interface, the module corresponding to one select utility of an associated plurality of utilities and configured to communicate with the one select utility, wherein the appliance control system operates the appliance based on communications with the one select utility through the module;
the module being powered from the appliance and controlled to be turned off by the appliance to a standby mode until the appliance needs to make a decision about power usage related to the appliance.

10. The household appliance control system of claim 7 where the module is powered from a separate power supply and the appliance control system operates the appliance in a low energy state or sleep mode while the module communicates with the one select utility.

* * * * *

UNITED STATES PATENT AND TRADEMARK OFFICE
CERTIFICATE OF CORRECTION

PATENT NO.       : 8,626,347 B2
APPLICATION NO.  : 13/715263
DATED            : January 7, 2014
INVENTOR(S)      : Watson et al.

It is certified that error appears in the above-identified patent and that said Letters Patent is hereby corrected as shown below:

In the Specifications

In Column 1, Line 17, delete "disclosure," and insert -- disclosure --, therefor.

In Column 1, Line 18, delete "appliances is" and insert -- appliances via --, therefor.

In Column 1, Line 34, delete "during," and insert -- during --, therefor.

In Column 1, Line 40, delete "bacteria," and insert -- bacteria --, therefor.

In Column 1, Line 47, delete "(0 degrees F.)." and insert -- 0 degrees F.). --, therefor.

In Column 1, Line 59, delete "(AMU" and insert -- (AMI) --, therefor.

In Column 2, Line 19, delete "mode or" and insert -- mode (or --, therefor.

In Column 2, Line 25, delete "time" and insert -- time, --, therefor.

In Column 2, Line 40, delete "determined," and insert -- determined --, therefor.

In Column 2, Line 59, delete "alter the" and insert -- after the --, therefor.

In Column 3, Line 8, delete "off" and insert -- off, --, therefor.

In Column 3, Line 10, delete "It one" and insert -- In one --, therefor.

In Column 4, Line 40, delete "impacting, the cost of the appliance, opening," and insert -- impacting the cost of the appliance, opening --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,626,347 B2

In Column 4, Line 44, delete "during," and insert -- during --, therefor.

In Column 5, Line 5, delete "configuring," and insert -- configuring --, therefor.

In Column 5, Line 7, delete "is process" and insert -- is a process --, therefor.

In Column 5, Line 24, delete "DSSM" and insert -- DSMM --, therefor.

In Column 5, Line 50, delete "MID tags" and insert -- RFID tags --, therefor.

In Column 6, Line 2, delete "in other" and insert -- in order --, therefor.

In Column 6, Line 7, delete "operating," and insert -- operating --, therefor.

In Column 6, Line 21, delete "i.e." and insert -- (i.e. --, therefor.

In Column 7, Line 24, delete "allowed," and insert -- allowed --, therefor.

In Column 7, Line 41, delete "can numerous" and insert -- can be numerous --, therefor.

In Column 8, Line 6, delete "during," and insert -- during --, therefor.

In Column 8, Line 10, delete "setting, during," and insert -- setting during --, therefor.

In Column 8, Line 12, delete "during" and insert -- (during --, therefor.

In Column 8, Line 25, delete "demand is" and insert -- demand via --, therefor.

In Column 8, Line 43, delete "(FIG. 20)," and insert -- (FIG. 20). --, therefor.

In Column 9, Line 21, delete "indicating," and insert -- indicating --, therefor.

In Column 10, Line 35, delete "ZibBee," and insert -- ZigBee, --, therefor.

In Column 10, Line 60, delete "an other" and insert -- any other --, therefor.

In Column 11, Line 41, delete "e.g.," and insert -- (e.g., --, therefor.

In Column 12, Line 2, delete "select," and insert -- select --, therefor.

In Column 12, Line 9, delete "FM AM SSB," and insert -- FM, AM SSB, --, therefor.

In Column 12, Line 9, delete "ZibBee," and insert -- ZigBee, --, therefor.

In Column 12, Line 29, delete "appliances fix" and insert -- appliances for --, therefor.

CERTIFICATE OF CORRECTION (continued)
U.S. Pat. No. 8,626,347 B2

In Column 12, Line 43, delete "ca)" and insert -- can --, therefor.

In Column 12, Line 46, delete "e.g.," and insert -- (e.g., --, therefor.